(12) United States Patent
Kopru et al.

(10) Patent No.: US 11,561,975 B2
(45) Date of Patent: *Jan. 24, 2023

(54) DYNAMIC TOPIC ADAPTATION FOR MACHINE TRANSLATION USING USER SESSION CONTEXT

(71) Applicant: EBAY INC., San Jose, CA (US)

(72) Inventors: Selcuk Kopru, San Jose, CA (US); Sanjika Hewavitharana, San Jose, CA (US); Hassan Sawaf, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 16/725,910

(22) Filed: Dec. 23, 2019

(65) Prior Publication Data

US 2020/0133948 A1 Apr. 30, 2020

Related U.S. Application Data

(63) Continuation of application No. 15/075,392, filed on Mar. 21, 2016, now Pat. No. 10,540,357.

(51) Int. Cl.
*G06F 16/2455* (2019.01)
*G06N 7/00* (2006.01)
*H04L 67/01* (2022.01)
*H04L 67/50* (2022.01)

(52) U.S. Cl.
CPC ......... *G06F 16/2455* (2019.01); *G06N 7/005* (2013.01); *H04L 67/01* (2022.05); *H04L 67/535* (2022.05)

(58) Field of Classification Search
CPC .................................................. G06F 16/2455
USPC ........................................................ 707/760
See application file for complete search history.

(56) References Cited

U.S. PATENT DOCUMENTS

| | | | |
|---|---|---|---|
| 7,890,493 B2 * | 2/2011 | Chen | G06F 40/58 707/713 |
| 7,984,034 B1 * | 7/2011 | Shaw | G06F 16/3337 707/706 |
| 8,051,061 B2 | 11/2011 | Niu et al. | |
| 8,316,019 B1 | 11/2012 | Ainslie et al. | |
| 8,930,338 B2 | 1/2015 | Velipasaoglu et al. | |
| 10,540,357 B2 | 1/2020 | Kopru et al. | |
| 2004/0230898 A1 | 11/2004 | Blakely et al. | |

(Continued)

OTHER PUBLICATIONS

Advisory Action received for U.S. Appl. No. 15/075,392, dated Nov. 9, 2018, 21 pages.

(Continued)

*Primary Examiner* — Muluemebet Gurmu
(74) *Attorney, Agent, or Firm* — Shook, Hardy & Bacon L.L.P.

(57) ABSTRACT

According to various embodiments, the Query Context Translation Engine identifies a topic of a search query history received during a current user session. The search query history in a first language. The Query Context Translation Engine identifies, in a translation table, target text that corresponds with a query in the search query history, the target text comprising at least one word. The Query Context Translation Engine obtains at least one search result based on a translation of the target text in a second language.

20 Claims, 7 Drawing Sheets

(56) References Cited

U.S. PATENT DOCUMENTS

2009/0083023 A1* 3/2009 Foster .................... G06F 40/45
  704/3
2017/0270101 A1 9/2017 Kopru et al.

OTHER PUBLICATIONS

Applicant Initiated Interview Summary received for U.S. Appl. No. 15/075,392, dated Nov. 19, 2018, 3 pages.
Final Office Action received for U.S. Appl. No. 15/075,392, dated Sep. 12, 2018, 21 pages.
Non-Final Office Action received for U.S. Appl. No. 15/075,392, dated Jan. 26, 2018, 13 pages.
Notice Of Allowance received for U.S. Appl. No. 15/075,392, dated Sep. 23, 2019, 8 pages.
Notice Of Allowance received for U.S. Appl. No. 15/075,392, dated May 31, 2019, 8 pages.
Response to Advisory Action filed on Dec. 3, 2018, for U.S. Appl. No. 15/075,392, dated Nov. 9, 2018, 21 pages.
Response to Final Office Action filed on Nov. 1, 2018, for U.S. Appl. No. 15/075,392, dated Sep. 12, 2018, 17 pages.
Response to Non-Final Office Action filed on Apr. 25, 2018 for U.S. Appl. No. 15/075,392 dated Jan. 26, 2018, 20 pages.

* cited by examiner

DYNAMIC TOPIC ADAPTATION FOR MACHINE TRANSLATION USING USER SESSION CONTEXT

CROSS-REFERENCE

This application is a Continuation of U.S. patent application Ser. No. 15/075,392, filed on Mar. 21, 2016, and titled "DYNAMIC TOPIC ADAPTATION FOR MACHINE TRANSLATION USING USER SESSION CONTEXT," the entire contents of which are incorporated herein by reference in their entirety.

BACKGROUND

Typical electronic commerce ("e-commerce") sites provide users (e.g., sellers) with computer-implemented services for selling goods or services through, for example, a website. For example, a seller may submit information regarding a good or service to the e-commerce site through a web-based interface. Upon receiving the information regarding the good or service, the e-commerce site may store the information as a listing that offers the good or service for sale. Other users (e.g., buyers) may interface with the e-commerce site through a search interface to find goods or services to purchase. For example, some typical e-commerce sites may allow the user to submit a search query that includes, for example, search terms that may be matched by the e-commerce site against the listings created by the sellers. Listings that match the submitted search query may be presented to the buyer as a search result and the buy may then select one of the listing to effectuate a purchase.

BRIEF DESCRIPTION OF THE DRAWINGS

The present invention is illustrated by way of example, and not by way of limitation, in the figures of the accompanying drawings in which.

DETAILED DESCRIPTION

Figure 1:
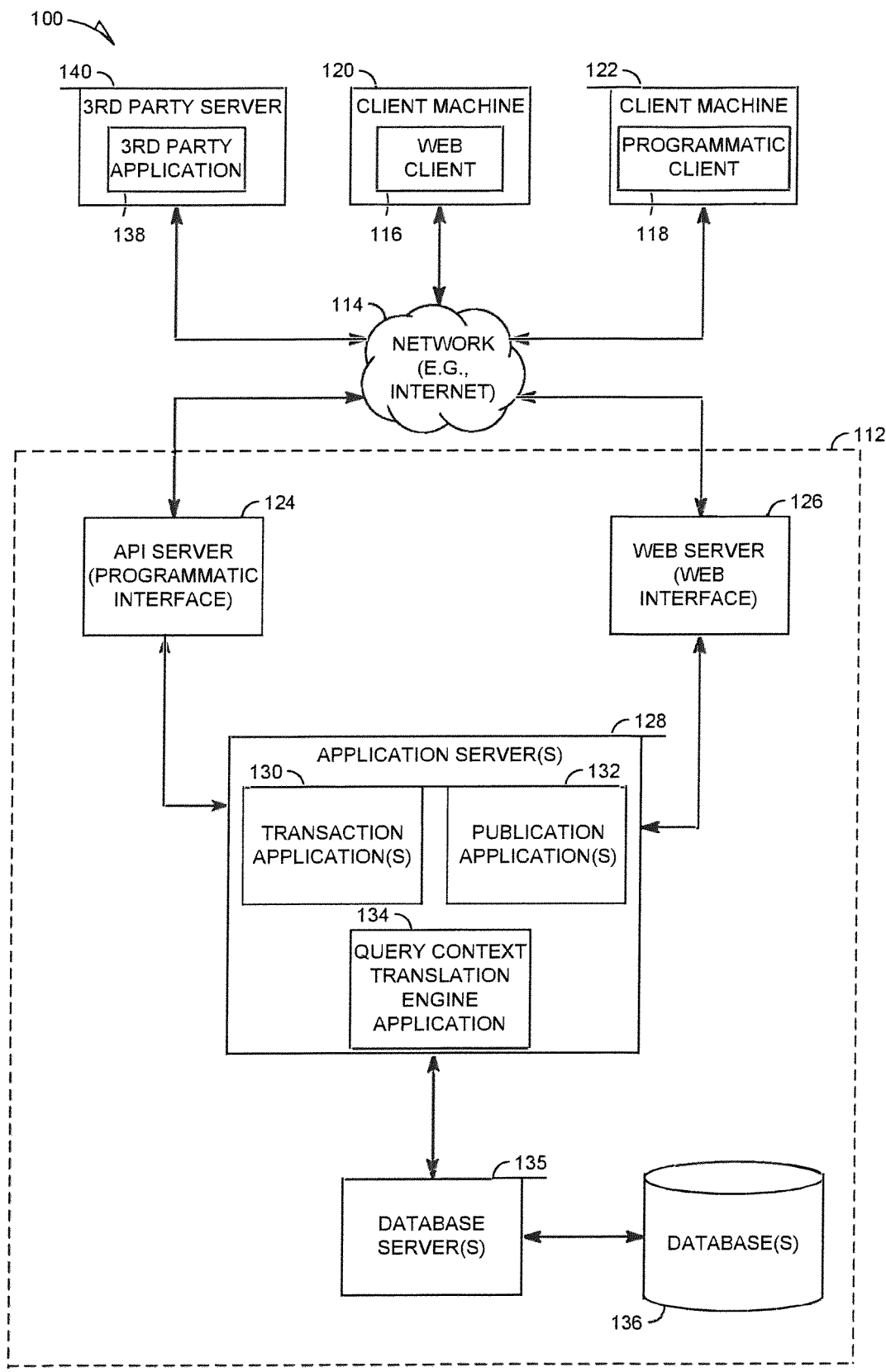
FIG. 1 is a network diagram depicting a publication system, according to one embodiment, having a client-server architecture configured for exchanging data over a network.

Example methods and systems directed to a Query Context Translation Engine are described. In the following description, for purposes of explanation, numerous specific details are set forth in order to provide a thorough understanding of example embodiments. It will be evident, however, to one skilled in the art that the present invention may be practiced without these specific details.

Conventional systems translate a user's current search query while ignoring prior successive search queries submitted by the user during the same user session. In contrast to conventional systems, the Query Context Translation Engine collects and utilizes the user's search query history to determine a translation for the user's most-recent query based on the assumption that the search query history collected during the user's current session includes previous search queries that related to a similar search subject. By taking into account multiple search queries from the user's current session, the Query Context Translation Engine can identify a most relevant translation for a most-recent search query than if only the most-recent search query is considered.

According to various embodiments, the Query Context Translation Engine generates a topic of a search query history received during a current user session. The search query history is in a first language. The Query Context Translation Engine, accesses a translation table, to generate target text in a second language that corresponds with a query in the search query history, the target text comprising at least one word. The Query Context Translation Engine (hereinafter "QCT Engine") obtains at least one search result based on a translation of the target text in a second language.

According to example embodiments, the QCT Engine provides automatic translation of user queries and product titles so listings from multiple language platforms can be seamlessly presented to the user. In conventional systems, machine translation of user-generated content snippets, such as queries, is especially difficult because of their short nature and absence of a rich context. The quality of translations plays a direct role in improving user experience.

Typically, a user performs a number of searches, refining the query over time, until the desired item is returned in a search listing. This session context information can provide a wealth of information in improving the user experience through better translations. The QCT Engine enhances the quality of machine translation of user queries by applying dynamic topic adaptation based on the user's search query history in the immediate past. Every time the user enters a new query, a dynamic context will be updated and all future queries coming from the same user will be translated based on the previous knowledge gathered from recent queries. The QCT Engine collects the user search history to build the dynamic context.

For example, the QCT Engine builds a topic model based on data from a publisher system. Such publisher system data includes listing of product titles, previously received user search queries submitted for a search listing of products and text from product descriptions. The QCT Engine identifies clusters of words and phrases. Each cluster is a statistical distribution of related words and phrases. Each cluster of related words and phrases is conceptually related to a topic. The QCT Engine assigns a topic identifier to each cluster. As such, a topic identifier thereby represents a statistical distribution of words and phrases that are related to each other. In one embodiment, a topic identifier can represent a pre-defined product category in the publisher system, such that a statistical distribution of words and phrases in a topic are related to a specific pre-defined product category.

According to an example embodiment, after an initial instance of the topic model is built, a user submits multiple, successive search queries for a particular type of product in a first language during a current user session. However, the publisher system includes robust inventory product listings available in a second language. For example, the user submits a first query of "hoodie", a second query of "jacket" and a third query of "fleece"—the most-recent query being "fleece." As such, the search query history for the user's current session includes at least the first, second and third queries in the first language. The QCT Engine collects the search query history in order to build a context of the user's searches and uses the search query history to identify the best translation of "fleece", where the best- or most relevant—translation of "fleece" will be submitted as a target search query against the inventory product listings that are in the second language.

To identify the most relevant translation for the user's most-recent query, the QCT Engine generates a query combination by concatenating at least the first, second and third queries ("hoodie jacket fleece"). The QCT Engine infers a topic of the query combination based on the topic model. The QCT Engine identifies a topic of the query combination to be the topic of "Men's Outerwear" in the topic model. That is, the words in the query combination ("hoodie jacket fleece") meet a threshold level of distribution in a statistical distribution of related words and phrases for the "Men's Outerwear" topic in the topic model built by the QCT Engine. In one embodiment, the QCT Engine performs Latent Dirichlet allocation ("LDA") on the query combination to identify a topic of the query combination. In another embodiment, the QCT Engine applies a Language Model perplexity approach or a Principal Component Analysis approach to infer the query combination's topic. In this respect, the QCT Engine treats the query combination as a document that itself has its own topic, where the topic of the query combination indicates the context of the user's search history.

Upon determining the query combination's topic, the QCT Engine accesses a translation table to identify the most relevant translation for the most-recent query. The translation table includes a plurality of terms, where each respective term comprises target text and a corresponding translation of that target text in a second language. Each target text further has one or more topic identifiers that reflect a probability that the target text is related to a topic in the topic model. For example, a first target text has a topic identifier signifying a 70% percent probability that the first target text is related to a "Men's Outerwear" topic and another topic identifier signifying a 30% percent probability that the first target text is related to a "Men's Fitness Apparel" topic. A second target text has a topic identifier signifying a 90% percent probability that the second target text is related to the "Men's Outerwear" topic and another topic identifier signifying a 10% percent probability that the first target text is related to a "Legal Services" topic.

Continuing with the "fleece" example, the QCT Engine selects the target text in the translation table that is most likely related to the query combination's "Men's Outerwear" topic according to the topic identifiers of the target text. The QCT Engine identifies string matches between the most-recent query ("fleece") and various target text in the translation table. A string match is any target text that meets a threshold string match percentage with the most-recent query. The QCT Engine utilizes the topic identifiers of the matching target text to identify which of the matching target text has a topic identifier signifying a highest probability of being related to the query combination's "Men's Outerwear" topic.

For example, a first matching target text includes a topic identifier signifying an 80% probability that the first matching target text is related to the "Men's Outerwear" topic and a second matching target text includes a topic identifier signifying a 70% probability that the second matching target text is related to the "Men's Outerwear" topic. In one embodiment, the QCT Engine generates combinations of the matching text. For example, the QCT Engine combine the first matching target text and the second matching target text and calculates a linear combination of their respective topic identifier probabilities (80%, 70%) to determine a probability that the target text combination is related to the "Men's Outerwear" topic.

The QCT ranks the target text and target text combination according to the values of their respective probabilities of being related to the "Men's Outerwear" topic. The QCT Engine selects the matching target text (or target text combination) with the highest probability. The QCT Engine selects the corresponding second language translation for the matching target text (or target text combination) with the highest probability. The selected corresponding second language translation is thereby the most-relevant translation of the most-recent query. The QCT Engine submits the selected corresponding second language translation as a search query against the inventory product listings of the publisher system.

In various example embodiments, the topic identifiers may also be combined with other information within the translation module to generate a final translation for the user query in the second language. For example, in the Statistical Machine Translation (SMT) paradigm, topic identifiers may be combined with translation model and the language model to assign a score for each possible translation option to the user query. The QCT engine may then select the option with the best (i.e. highest) score as the translation of the user query in the second language. Other translation paradigms may use the topic information in other ways to aid the generation of the most relevant translation for the user query. The QCT Engine submits the generated translation for "fleece" as a target search query against the product inventory listings and receives one or more search results for products that have a product category similar to "Men's Outerwear."

It is understood that various example embodiments include the generation of a module(s) to cause a computing device(s) to perform any and/or all of the actions described herein. Once the module(s) is generated, the module(s) is sent for installation on the computing device(s). In one embodiment, the generated modules comprise source code that, when compiled by a computing device(s), creates object code that causes the computing device(s) to perform any or all of the various actions, steps, methods, and/or operations described herein. In other embodiments, the generated modules comprise object code that causes the computing device(s) to perform various actions, steps, methods, and/or operations described herein.

Platform Architecture

FIG. 1 is a network diagram depicting a translation system, according to one embodiment, having a client-server architecture configured for exchanging data over a network. The publication system 100 may be a transaction system where clients, through client machines 120, 122 and a third party server 140, may communicate, view, search, and exchange data with network-based publisher 112. For example, the publication system 100 may include various applications for interfacing with client machines and client applications that may be used by users (e.g., buyers and sellers) of the system to publish items for sale in addition to facilitating the purchase and shipment of items and searching for items.

The network-based publisher 112 may provide server-side functionality, via a network 114 (e.g., the Internet) to one or more clients. The one or more clients may include users that utilize the network-based publisher 112 as a transaction intermediary to facilitate the exchange of data over the network 114 corresponding to user transactions. User transactions may include receiving and processing item and item related data and user data from a multitude of users, such as payment data, shipping data, item review data, feedback data, etc. A transaction intermediary such as the network-based publisher 112 may include one or all of the functions associated with a shipping service broker, payment service and other functions associated with transactions between one or more parties. For simplicity, these functions are discussed as being an integral part of the network-based publisher 112, however it is to be appreciated that these functions may be provided by publication systems remotely and/or decoupled from the network-based publisher 112.

In various embodiments, the data exchanges within the publication system 100 may be dependent upon user selected functions available through one or more client/user interfaces (UIs). The UIs may be associated with a client machine, such as the client machine 120, utilizing a web client 116. The web client 116 may be in communication with the network-based publisher 112 via a web server 126.

The UIs may also be associated with a client machine 122 utilizing a client application 118, or a third party server 140 hosting a third party application 138. It can be appreciated in various embodiments the client machine 120, 122 may be associated with a buyer, a seller, payment service provider or shipping service provider, each in communication with the network-based publisher 112 and optionally each other. The buyers and sellers may be any one of individuals, merchants, etc.

An application program interface (API) server 124 and a web server 126 provide programmatic and web interfaces to one or more application servers 128. The application servers 128 may host one or more other applications, such as transaction applications 130, publication applications 132 and a QCT Engine application 134. The application servers 128 may be coupled to one or more data servers that facilitate access to one or more storage devices, such as the data storage 136.

The transaction applications 130 may provide a number of payment processing modules to facilitate processing payment information associated with a buyer purchasing an item from a seller. The publication applications 132 may include various modules to provide a number of publication functions and services to users that access the network-based publisher 112. For example, these services may include, inter alia, formatting and delivering search results to a client.

FIG. 1 also illustrates an example embodiment of a third party application 138, which may operate on a third party server 140 and have programmatic access to the network-based publisher 112 via the programmatic interface provided by the API server 124. For example, the third party application 138 may utilize various types of data communicated with the network-based publisher 112 and support one or more features or functions normally performed at the network-based publisher 112. For example, the third party application 138 may receive a copy of all or a portion of the data storage 136 that includes buyer shipping data and act as the transaction intermediary between the buyer and seller with respect to functions such as shipping and payment functions. Additionally, in another embodiment, similar to the network-based publisher 112, the third party application 138 may also include modules to perform operations pertaining to payment, shipping, etc. In yet another embodiment, the third party server 140 may collaborate with the network-based publisher 112 to facilitate transactions between buyers and sellers, such as by sharing data and functionality pertaining to payment and shipping, etc.

Figure 2:
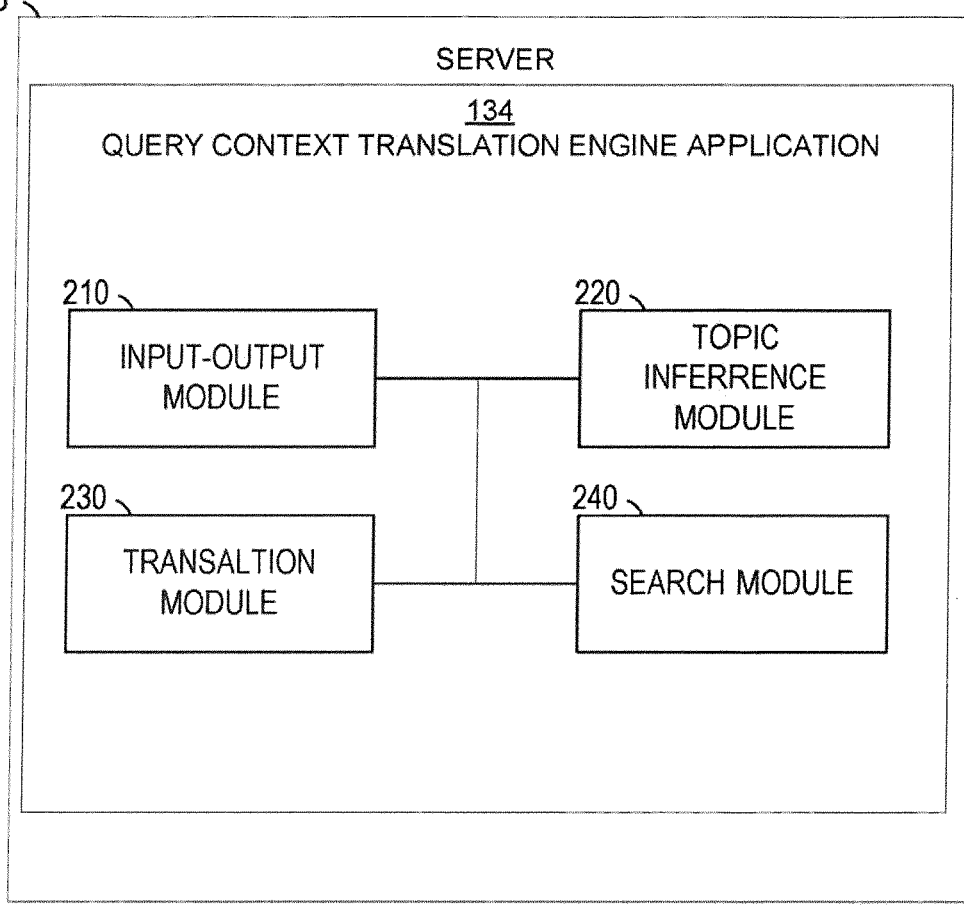
FIG. 2 is a block diagram illustrating components of a Query Context Translation Engine, according to some example embodiments.

FIG. 2 is a block diagram illustrating components of a Query Context Translation Engine 134, according to some example embodiments. The components communicate with each other to perform the operations of the QCT Engine 134.

The QCT Engine manager 134 is shown as including an input-output module 210, a topic inference module 220, a translation module 230 and a search module 240, all configured to communicate with each other (e.g., via a bus, shared memory, or a switch).

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The input-output module 210 is a hardware-implemented module which manages, controls, stores, and accesses information regarding inputs and outputs. For example, the input-output module 210 receives inputs such as one or more search queries from a user during a current session of accessing a webpage of the publisher system 112. The input-output module 210 further provides output such as at least one search listing from a search based at least on a translation of a most-recent search query.

The topic inference module 220 is a hardware-implemented module which manages, controls, stores, and accesses information for applying a topic model to a query combination. The topic inference module 220 concatenates a most-recent query and at least one previous query to generate the query combination. The search combination module 220 identifies a topic of the query combination which is used inside the translation module 230.

The translation module 230 is a hardware-implemented module which manages, controls, stores, and accesses information regarding identifying a translation of a search query. A translation table includes target text, where each portion of target text has one or more topic identifiers. A topic identifier represents a pre-defined topic and a probability value that signifies how likely that target text is related to the pre-defined topic. The translation table module 230 identifies a particular target text that is similar to a most-recent query of a user that also has a highest probability value for the topic.

The search module 240 is a hardware-implemented module which manages, controls, stores, and accesses information for obtaining at least one search result. The search module 240 performs a search based on the second language translation for the matching text target text.

Figure 3:
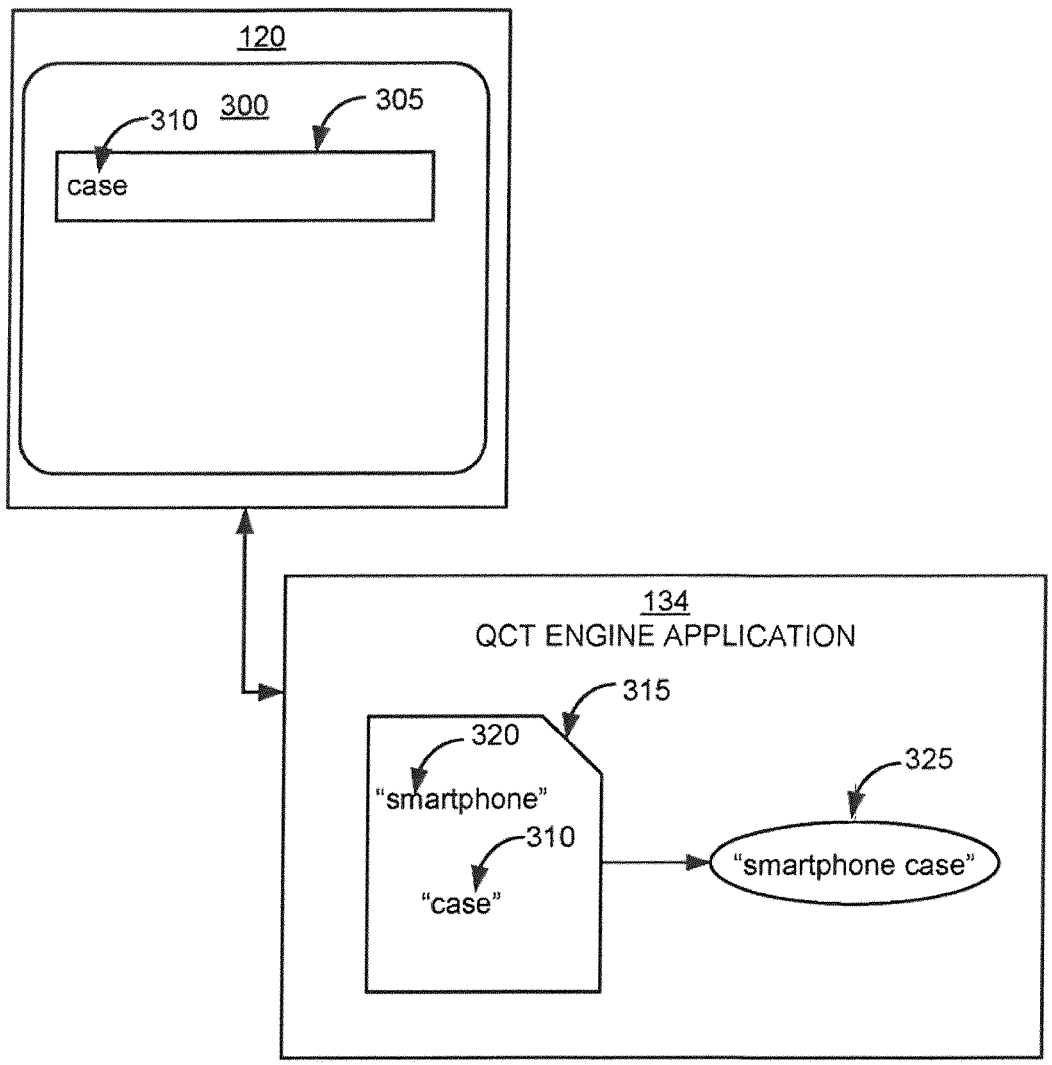
FIG. 3 is a block diagram illustrating a Query Context Translation Engine concatenating a user's search query history, according to some example embodiments.

FIG. 3 is a block diagram illustrating a Query Context Translation Engine 134 concatenating a user's search query history 315, according to some example embodiments.

As show in FIG. 3, a user of a client machine 120 accesses a webpage 300. For example, the webpage 300 can be associated with the publisher system 112, such that the client machine 120 submits a search query 310 through a search bar 305 that searches one or more inventory listings of items available for purchase via the publisher system 112. As the user of the client machine 120 inputs successive search queries, the QCT Engine 134 collects the successive search queries and stores a search query history 315 for the user's current session. For example, the search query history 315 includes a most-recent query 310 ("case") and at least one previous query 320 ("smartphone").

The QCT Engine 134 generates a query combination 325 ("smartphone case") by concatenating the search queries 310, 320 in the search query history 315. The query combination provides a greater level of context as to what kind of item or product the user is trying to purchase. In addition, certain queries, such as the most-recent query 310 ("case"), are ambiguous since they can relate to multiple types of items or products. For example, the keyword of "case" can relate to an item that is a cellphone accessory, a legal lawsuit or home furniture (such as a bookcase). By building the search query history 315 and generating the query combination 325, the QCT Engine 134 provides a greater probability that a more accurate search of items will be performed.

Figure 4:
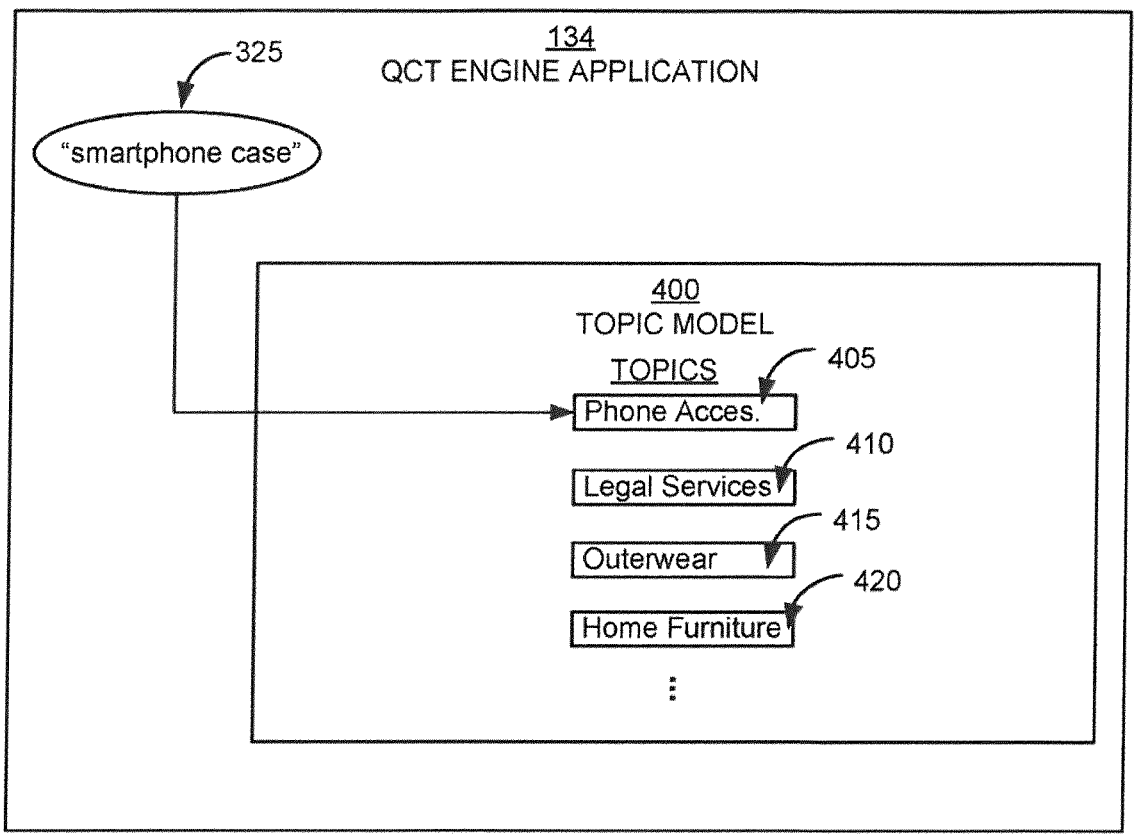
FIG. 4 is a block diagram illustrating a Query Context Translation Engine applying a topic model to a query combination, according to some example embodiments.

FIG. 4 is a block diagram illustrating a Query Context Translation Engine 134 applying a topic model 400 to a query combination 325, according to some example embodiments.

The topic model 400 includes a plurality of topic labels 405, 410, 415, 420 . . . . The topic labels 405, 410, 415, 420 . . . map to product categories of the publisher system 112. That is, the inventory product listing of the publisher system 112 has each respective product listing tagged with one or more product categories. Each topic label 405,410, 415,420 thereby represents a statistical distribution of words and phrases that are related to a product category in the publisher system 112.

The QCT Engine 134 treats the query combination 325 as a document. For example, the QCT Engine 134 applies LDA to the query combination 325 to determine a topic distribution of the text of the user's successive search queries, 310, 320. The QCT Engine 134 determines a most prevalent topic(s) in the LDA-generated topic distribution of the query combination 325. The QCT Engine 134 compares the most-prevalent topic(s) of the query combination 325 to the respective statistical distributions of words and phrases of the topic labels 405, 410, 415, 420 . . . in the QCT Engine's 134 topic model 400.

For example, the QCT Engine 134 determines that the most-prevalent topic(s) of the query combination 325 meet a threshold statistical distribution for the "Phone Accessories" topic label 405. In one embodiment, the QCT Engine 134 identifies that the phrase "smartphone case" appears at least at a threshold percentile in the statistical distribution of the words and phrases that relate to the "Phone Accessories" topic label 405.

In another embodiment, the QCT Engine 134 infers the topic of the query combination 325 by generating topic output according to a Language Model perplexity approach or by implementing Principal Component Analysis. Based on the inferred topic output, the QCT Engine 134 determines a match between the inferred topic output and the pre-defined topics 405, 410, 415, 420 . . . in the topic model 400. Determining a match can be done by selecting a pre-defined topics 405 from the topic model 400 that meets a similarity threshold with the inferred topic output.

Figure 5:
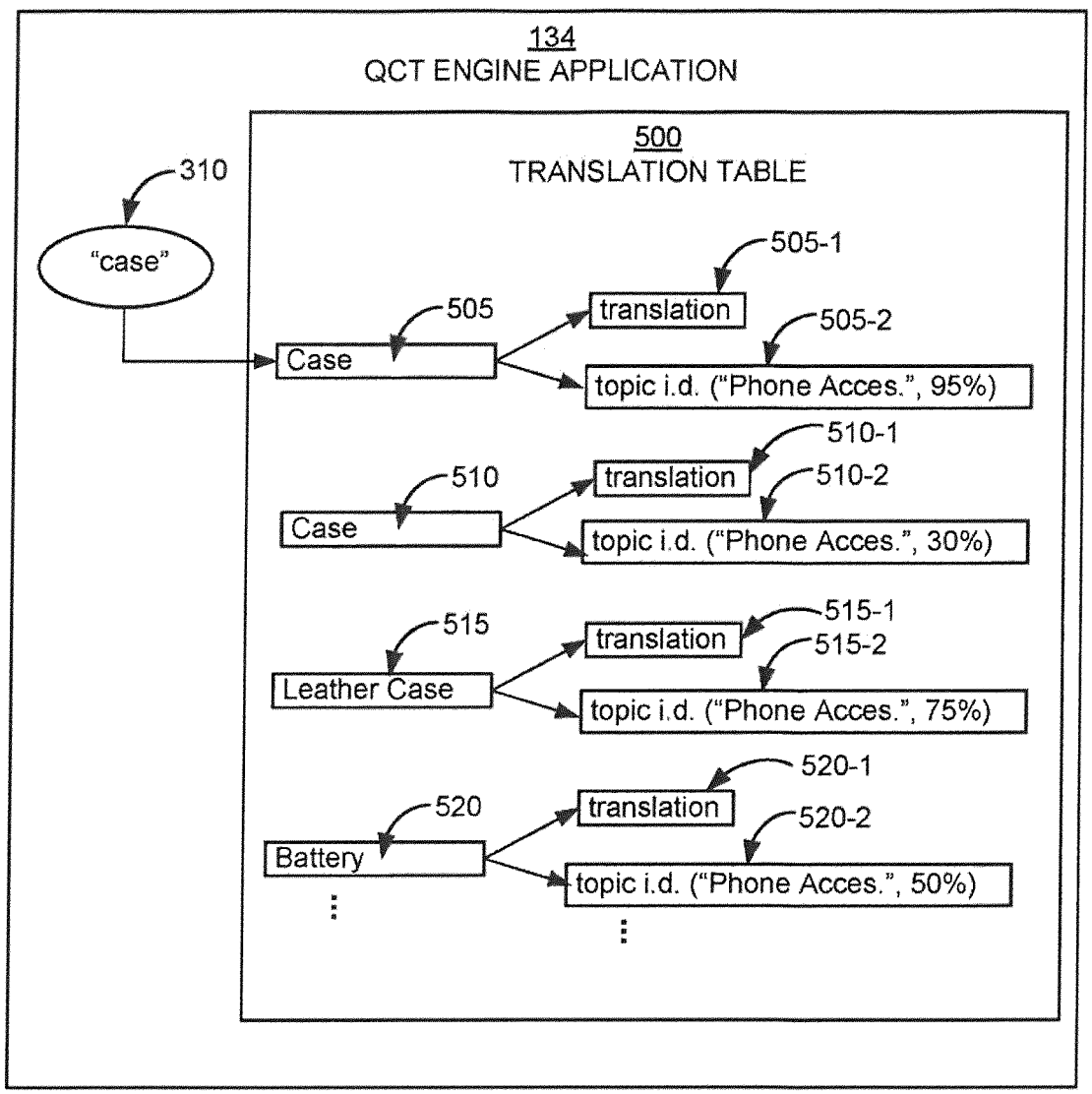
FIG. 5 is a block diagram illustrating a Query Context Translation Engine generating a translation for a most-recent query from a translation table for a particular topic, according to some example embodiments.

FIG. 5 is a block diagram illustrating a Query Context Translation Engine 134 generating a translation 510-1 for a most-recent query 310 from a translation table 500 for a particular topic 405-1, according to some example embodiments.

The QCT Engine 134 accesses the translation table in order to determine a translation for a most-recent query 310 "case" submitted by the user. The translation table 500 includes a plurality of portions of target text 505, 510, 515, 520 . . . . Each portion target text 505, 510, 515, 520 . . . represents one or more words. Each portion of target text 505, 510, 515, 520 . . . is linked to a corresponding translation 505-1, 510-1, 515-1, 520-1 . . . in a second language. The inventory product listings of the publisher system 112 is in the second language—as opposed to the first language in which the most-recent query 310 was received. The QCT Engine 134 utilizes the translation table 500 in order to generate a translation for the most-recent query 310 such that the generated translation can be used as a search query against the inventory product listings of the publisher system 112.

Each portion of target text 505, 510, 515, 520 . . . is further linked to one or more topic identifiers 505-2, 510-2, 515-2, 520-2 . . . . That is, a particular target text can be linked to a plurality of different topic identifiers. Each topic identifier 505-2, 510-2, 515-2, 520-2 represents one of the pre-defined topics 405,410,415, 420 . . . of the topic model 400 and includes a probability value. The probability value signifies a probability the target text is related to pre-defined topic of the topic model.

For example, target text 505 "case" is linked to a topic identifier 505-2 which signifies that there is an 95% probability that the target text 505 is related to the pre-defined topic of "Phone Accessories." Target text 510 "case" (with a different translation in second language than Target text 505) is linked to a topic identifier 510-2 which signifies that there is a 30% probability that the target text 510 is also related to the pre-defined topic of "Phone Accessories." Target text 515 "leather case" is linked to a topic identifier 515-2 which signifies that there is an 75% probability that the target text 515 is also related to the pre-defined topic of "Phone Accessories." Target text 520 "Battery" is linked to a topic identifier 520-2 which signifies that there is a 50% probability that the target text 520 is also related to the pre-defined topic of "Phone Accessories." It is understood that other target text in the translation table 500 have respective topic identifiers related to topics other than "Phone Accessories."

The QCT Engine 134 calculates a string match percentage between the most-recent query 310 and each target text 505, 510, 515, 520 . . . . The QCT Engine 134 identifies respective matching target text 505, 510, 515 that meet a threshold string match percentage with the most-recent query 310. The target text 520 of "battery" clearly fails to meet the threshold string match percentage, whereas target text 505 ("case"), target text 510 ("case") and target text ("leather case") meet the threshold string match percentage.

As illustrated in FIG. 5, the QCT Engine 134 identifies matching target text 505, 510 that have topic identifiers 505-2, 510-2 related to the topic "Phone Accessories" of the search query history 325. The QCT Engine 134 ranks the topic identifiers 505-2, 510-2 according to their respective probabilities of 95%, 30%.

The QCT Engine 134 selects the matching target text 505 that has the highest probability of being related to the search query history's 325 topic of "Phone Accessories."

The QCT Engine 134 identifies the translation 505-1 of the highest ranked, matching target text 505. The translation 505-1 serves as the most relevant translation of the most-recent query 310 since the topic of the query combination 325 was used to sort the matching target text 505, 510 in the translation table 500 according to their respective topic identifier probabilities. The QCT Engine 134 submits the translation 505-1 as a search query against inventory product listings of the publisher system 112.

Figure 6:
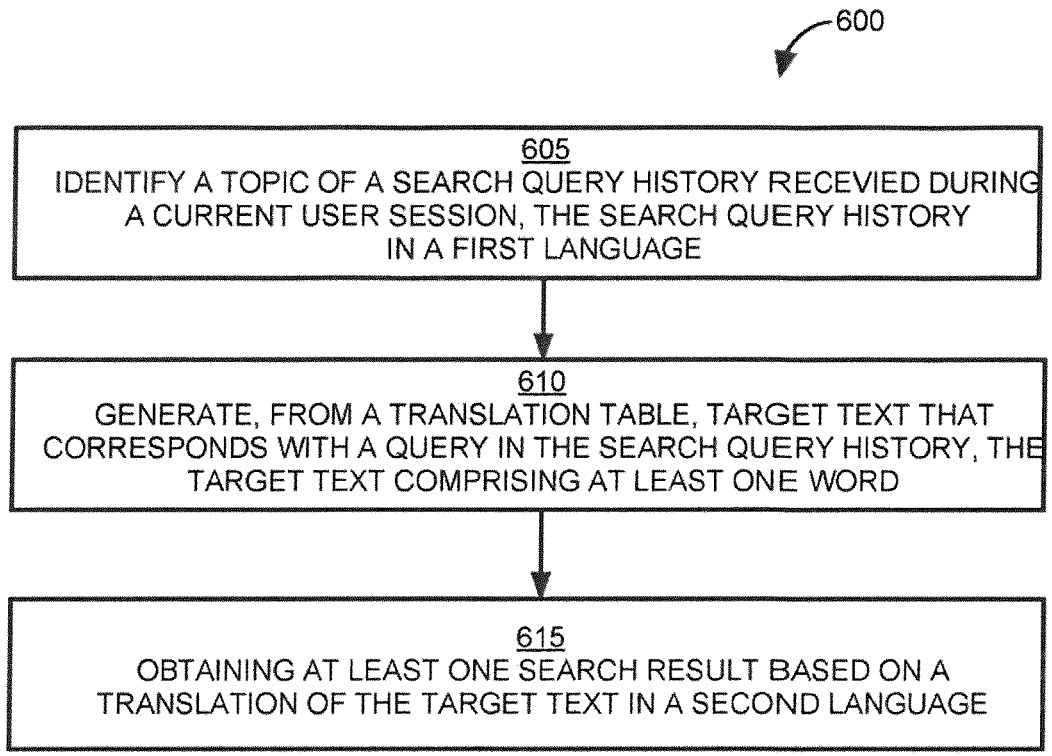
FIG. 6 is a flow diagram illustrating an example of method operations involved in a method of obtaining search results based on a translation of target text, according to some example embodiments.

FIG. 6 is a flow diagram illustrating an example of method operations involved in a method 600 of obtaining search results based on a translation of target text, according to some example embodiments.

At operation 605, the QCT Engine 134 identifies a topic of a search query history received during a current user session. The search query history is in a first language. The QCT Engine 134 generates a query combination 325 based on a concatenation of a most-recent query 310 and at least one previous query 320 in the search query history 315. The QCT Engine 134 identifies a matching topic 405, from a plurality of possible topics 405-420 . . . . The matching topic 405 corresponds with a topic of the query combination 325.

At operation 610, the QCT Engine 134 generates, from a translation table, target text that corresponds with a query in the search query history 315. The target text comprises at least one word. The QCT Engine 134 accesses the translation table 500, wherein each portion of target text 505-520 . . . includes at least one topic identifier 505-2-520-2 . . . . Each topic identifier 505-2-520-2 signifies a probable relation between the portion of the target text and a respective pre-defined topic. The QCT Engine 134 selects a particular target text that matches with the most-recent query and has particular topic identifier signifying a highest extent of a probable relation with the matching pre-defined topic.

In some embodiments, the QCT Engine 134 combines matching target text to generate one or more target text combinations. For example, if a most-recent query is "outdoor fleece jacket" and a first matching target text is "fleece jacket" and a second matching target text is "outdoor," the QCT Engine 134 generates a target text combination of "outdoor fleece jacket" and calculates a topic identifier probability for the target text combination based on a result of calculating a linear combination of the topic identifier probabilities of the first and second matching target texts. The QCT Engine 134 also generates a second language translation for the newly-created target text combination. The QCT Engine 134 treats the target text combination as a portion of target text that is ranked with all other matching target text according to the calculated probability of being related to the topic of the most-recent query. In some embodiments, the QCT Engine 134 may use other additional information such as the Translation Model probability, Language Model probability in determining the best matching Target text combination that matches with the most-recent query 310, and subsequently generating a translation in the second language.

As discussed above, the QCT Engine 134 selects the matching target text (or target text combination) that has a highest-probability of being related to the most-recent query's topic. The QCT Engine 134 identifies a second language translation of the selected, highest-ranked target text.

At operation 615, the QCT Engine 134 obtains at least one search result based on a translation 505-1 of the target text 505 in a second language. The QCT Engine 134 submits the second language translation 505-1 of the matching target text 505 as a target search query. The QCT Engine 134 retrieves a listing of search results for the most-recent query 310 based on the second language translation 510-1 of the matching target text 510.

Exemplary Computer Systems

Figure 7:
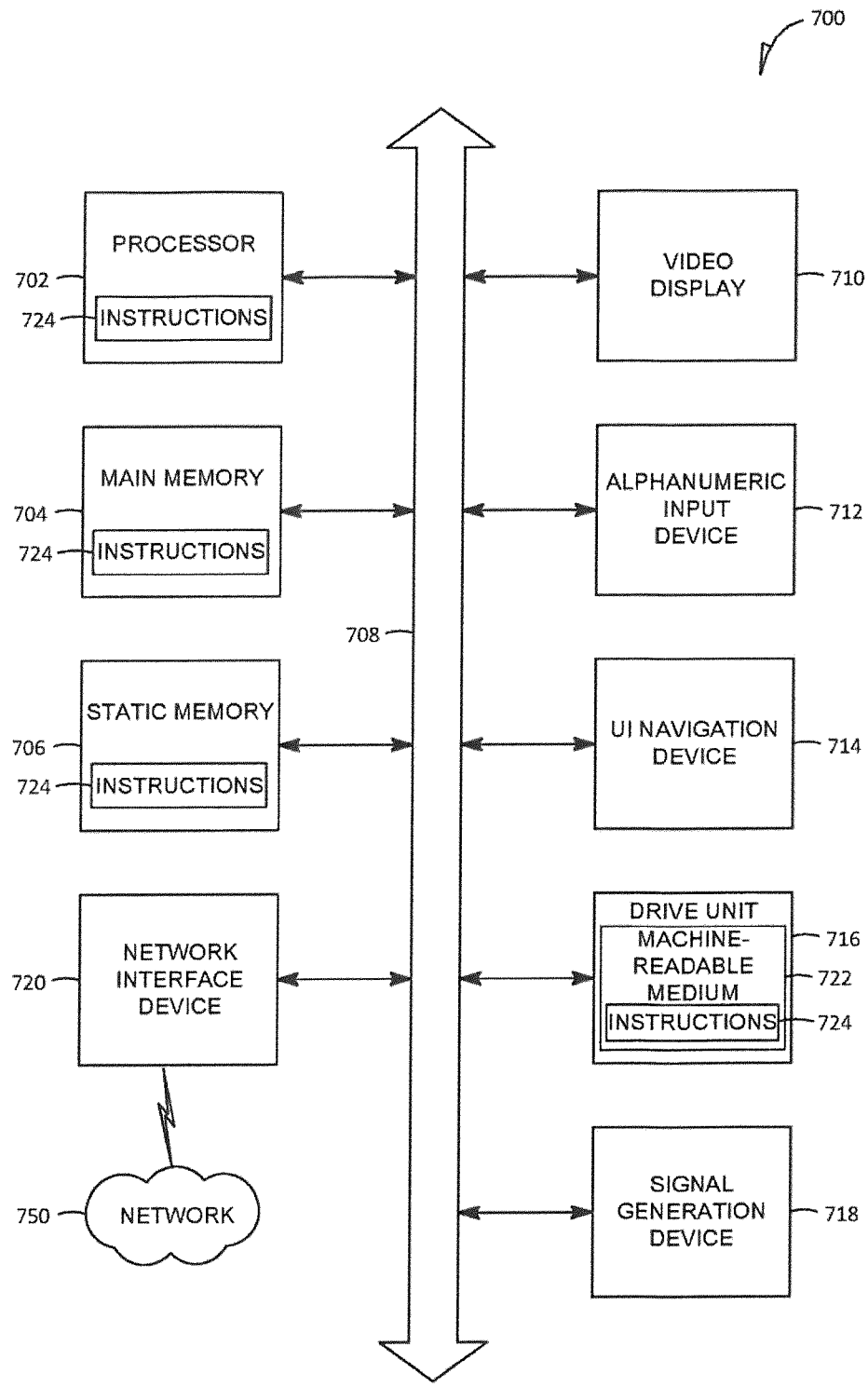
FIG. 7 shows a diagrammatic representation of machine in the example form of a computer system within which a set of instructions may be executed causing the machine to perform any one or more of the methodologies discussed herein.

FIG. 7 shows a diagrammatic representation of machine in the example form of a computer system 700 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 508. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., HTTP).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in example embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Furthermore, the following claims are hereby incorporated into the Detailed Description, with each claim standing on its own as a separate embodiment.

The invention claimed is:

1. A computer-implemented method for providing language translation services for item searches, the method comprising:
   receiving a most-recent query that includes a text in a first language, wherein the most-recent query is associated with a user search history comprising a plurality of queries;
   accessing a plurality of translations of the text, the plurality of translations of the text comprising a first translation of the text and a second translation of the text;
   accessing a topic related to the user search history and the text, wherein the topic is statistically prevalent based on topics associated with the plurality of search queries including the most-recent query;
   determining a translation for the text based on both one of the plurality of translations for the text and the topic related to the user search history and the text;
   selecting the translation for the text, wherein the translation for the text is in a second language;
   obtaining a search result based on the translation for the text; and
   causing display, within a user interface, of a first listing based on the search result.

2. The computer-implemented method of claim 1, further comprising:
   accessing a translation table, wherein the translation for the text is selected using the translation table, wherein the translation table comprises the plurality of translations comprising at least the translation for the text, wherein each of the plurality of translations includes a topic identifier signifying a probable relation to a pre-defined topic.

3. The computer-implemented method of claim 2, wherein the plurality of translations are ranked in the translation table according to their respective probable relation with a matching pre-defined topic.

4. The computer-implemented method of claim 3, further comprising:
   selecting a highest-ranked translation from the plurality of translations, wherein the highest-ranked translation is the translation for the text.

5. The computer-implemented method of claim 1, wherein the topic related to the user search history is identified in a topic model.

6. The computer-implemented method of claim 5, wherein the topic model is based on data from a publisher system, the publisher system including product titles, previous user search queries, and product descriptions.

7. The computer-implemented method of claim 1, wherein identifying the topic related to the user search history comprises:
   generating a query combination based on a concatenation of the most-recent query and at least one previous query of the plurality of search queries; and
   identifying a matching pre-defined topic, from a plurality of possible pre-defined topics, of at least a portion of trained data that matches the topic related to the user search history.

8. A non-transitory machine-readable hardware storage device for providing language translation services for item searches, storing a set of instructions that, when executed by a processor of a machine, causes the machine to perform operations comprising:
   receiving a most-recent query that includes a text in a first language, wherein the most-recent query is associated with a user search history comprising a plurality of queries;
   accessing a plurality of translations of the text, the plurality of translations of the text comprising a first translation of the text and a second translation of the text;
   accessing a topic related to the user search history and the text, wherein the topic is statistically prevalent based on topics associated with the plurality of search queries including the most-recent query;
   determining a translation for the text based on both one of the plurality of translations for the text and the topic related to the user search history and the text;
   selecting the translation for the text, wherein the translation for the text is in a second language;
   obtaining a search result based on the translation for the text; and
   causing display, within a user interface, of a first listing based on the search result.

9. The storage device of claim 8, the operations further comprising:
   accessing a translation table, wherein the translation for the text is selected using the translation table, wherein the translation table comprises the plurality of translations comprising at least the translation for the text, wherein each of the plurality of translations includes a topic identifier signifying a probable relation to a pre-defined topic.

10. The storage device of claim 8, wherein the plurality of translations are ranked in the translation table according to their respective probable relation with a matching pre-defined topic.

11. The storage device of claim 8, further cause the computer to:
   selecting a highest-ranked translation from the plurality of translations, wherein the highest-ranked translation is the translation for the text.

12. The storage device of claim 8, wherein the topic related to the user search history is identified in a topic model.

13. The storage device of claim 8, wherein the topic model is based on data from a publisher system, the publisher system including product titles, previous user search queries, and product descriptions.

14. The storage device of claim 8, wherein identifying the topic related to the user search history comprises:
   generating a query combination based on a concatenation of the most-recent query and at least one previous query of the plurality of search queries; and identifying a matching pre-defined topic, from a plurality of possible pre-defined topics, of at least a portion of trained data that matches the topic related to the user search history.

15. A system for providing language translation services for item searches comprising:
one or more processors; and
a machine-readable hardware storage device coupled with the one or more processors, the machine-readable hardware storage device storing instructions that, when executed by the one or more processors, cause the system to perform operations comprising:
receiving a most-recent query that includes a text in a first language, wherein the most-recent query is associated with a user search history comprising a plurality of queries;
accessing a plurality of translations of the text, the plurality of translations of the text comprising a first translation of the text and a second translation of the text;
accessing a topic related to the user search history and the text, wherein the topic is statistically prevalent based on topics associated with the plurality of search queries including the most-recent query;
determining a translation for the text based on both one of the plurality of translations for the text and the topic related to the user search history and the text;
selecting the translation for the text, wherein the translation for the text is in a second language;
obtaining a search result based on the translation for the text; and
causing display, within a user interface, of a first listing based on the search result.

16. The system of claim 15, the operations further comprising:
accessing a translation table, wherein the translation for the text is selected using the translation table, wherein the translation table comprises the plurality of translations comprising at least the translation for the text, wherein each of the plurality of translations includes a topic identifier signifying a probable relation to a pre-defined topic, wherein the plurality of translations are ranked in the translation table according to their respective probable relation with a matching pre-defined topic.

17. The system of claim 15, the operations further comprising:
selecting a highest-ranked translation from the plurality of translations, wherein the highest-ranked translation is the translation for the text.

18. The system of claim 15, wherein the topic related to the user search history is identified in a topic model.

19. The system of claim 18, wherein the topic model is based on data from a publisher system, the publisher system including product titles, previous user search queries, and product descriptions.

20. The system of claim 15, wherein identifying the topic related to the user search history comprises:
generating a query combination based on a concatenation of the most-recent query and at least one previous query of the plurality of search queries; and
identifying a matching pre-defined topic, from a plurality of possible pre-defined topics, of at least a portion of trained data that matches the topic related to the user search history.

* * * * *